July 7, 1953  D. P. SCHWESTER  2,644,879
SPIRALLY WOUND CORRUGATED WELDED TUBING
Filed Aug. 13, 1951  2 Sheets-Sheet 1
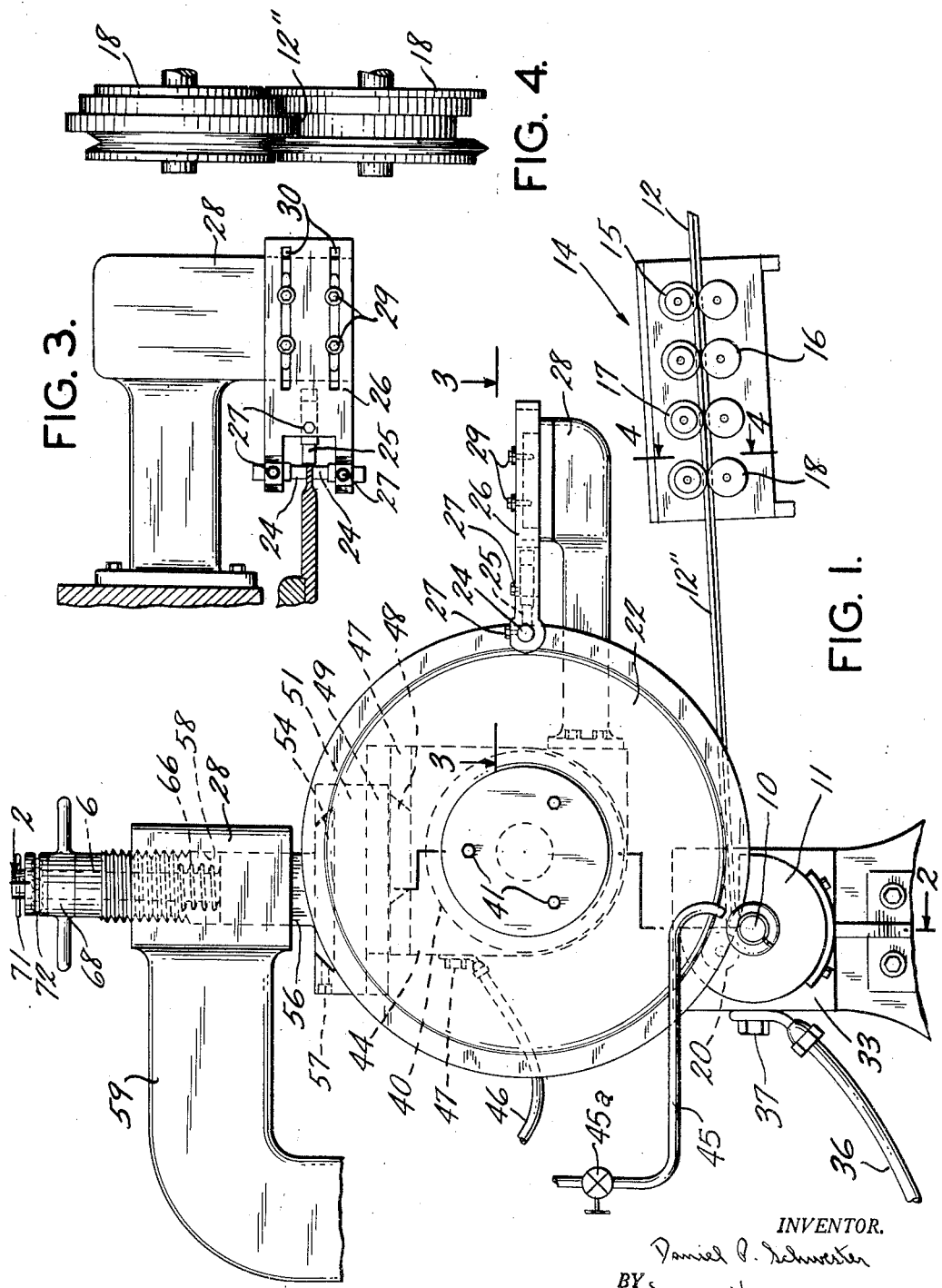
INVENTOR.
Daniel P. Schwester
BY
ATTORNEYS.

July 7, 1953 D. P. SCHWESTER 2,644,879
SPIRALLY WOUND CORRUGATED WELDED TUBING
Filed Aug. 13, 1951 2 Sheets-Sheet 2
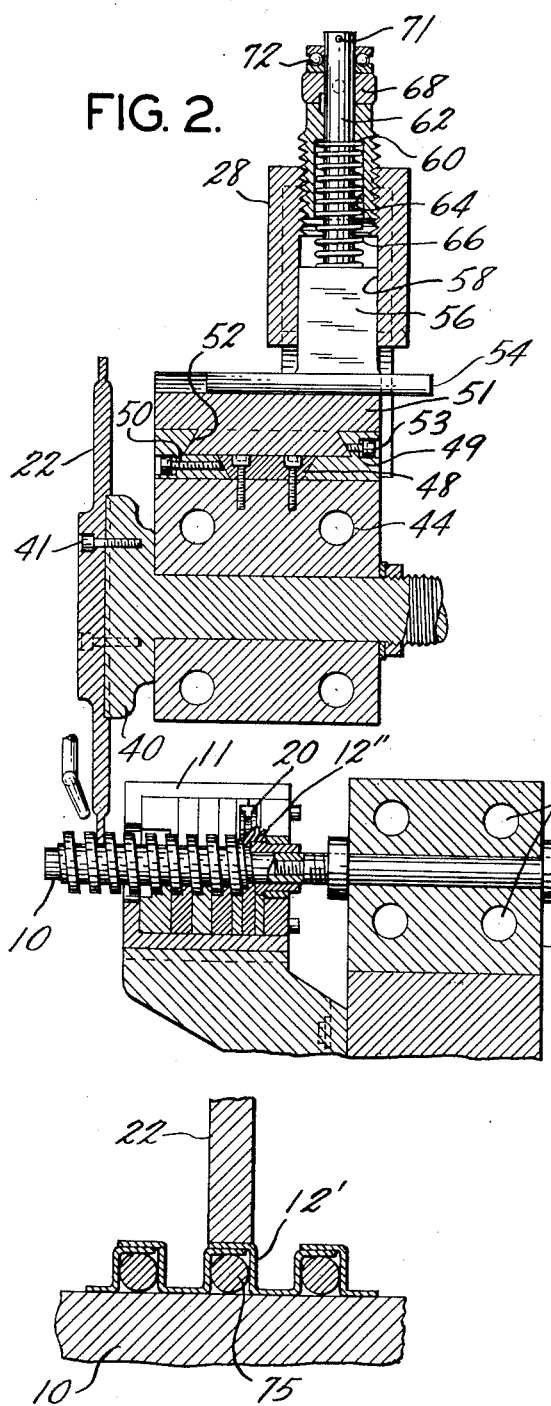
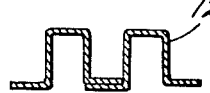
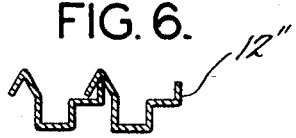
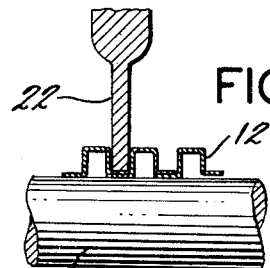
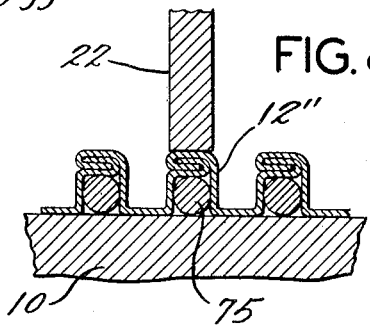
INVENTOR.
Daniel P. Schwester
BY Emery, Varney,
Whittemore & Dix
ATTORNEYS.

Patented July 7, 1953

2,644,879

UNITED STATES PATENT OFFICE 2,644,879

SPIRALLY WOUND CORRUGATED WELDED TUBING

Daniel Paul Schwester, East Orange, N. J., assignor, by mesne assignments, to Titeflex, Inc., Newark, N. J., a corporation of Massachusetts Application August 13, 1951, Serial No. 241,569

13 Claims. (Cl. 219—6)

This invention relates to the manufacture of metal tubing which is made by wrapping a strip of metal in a helix.

Such tubing has a helical seam which may be formed by either lapping or interlocking the adjacent edges of successive convolutions. The seam may be welded or soldered. With light gage material from which flexible, corrugated metal tubing or hose is made, it is conventional to form the tubing with a solder wire and flux in an interlocking seam. After the tubing has been wound, it is passed through a furnace which raises the temperature high enough to fuse the solder.

There are certain disadvantages in soldered seams. Even with silver solder, the seam does not have the strength of a welded seam and cannot stand the elevated temperatures to which a welded seam can be subjected. Another disadvantage is that the heating of the tubing to fuse the solder also anneals the metal of which the tubing is made, and this necessitates a subsequent hardening operation if the intended characteristics of the tube called for hardening; which they usually do. The soldered tubes also require a subsequent cleaning operation after being heated because flux on the inside of the tubing often forms flakes. It is difficult to thoroughly clean the inside of tubing having a corrugated surface.

Welding of the seams has the advantage of eliminating the necessity of the solder wire, flux and furnace, as well as the cleaning operation. Electric resistance welding, where the flow of current is confined to a small area, produces a satisfactory weld without heating the surrounding metal of the tube, and the welded tube has the same hardness as the original metal strip.

In the prior art it has been the practice to make resistance welds of helical seams by passing the seam between roller electrodes, one located outside of the tubing and the other located within the tubing. This apparatus cannot be used for tubes of very small diameter because there is not sufficient space within the tube for a roller electrode. Another disadvantage has been that the rollers do not stay in good condition for very long periods and it has been impossible to inspect the inside roller while the apparatus is operating. It is also difficult to recondition the inside roller when necessary, and it cannot be replaced while making a length of tubing.

It is an object of this invention to provide an improved tube making machine for helical seam, metal tubing. One feature of the invention is that it uses a continuous surface of a mandrel as one of the electrodes of the resistance welding circuit.

Another object is to provide a machine that wraps a longitudinally corrugated, metal strip in a helix on a mandrel with the adjacent edges of successive convolutions overlapping one another at the bottom of the corrugation to form a helical seam; and a machine that welds the seam by resistance welding.

One of the principal advantages of this invention is that the welded tubing, in addition to being stronger, is considerably lighter than comparable tubing of the prior art. The reason for this is that the invention lends itself to the manufacture of lap seams in place of interlocked seams, and the lap seam has only two thicknesses of metal whereas the interlocked seam has four thicknesses. Because of the narrow width of strip used for corrugated metal tubing, and the consequent low pitch of the helix, the seam comprises a substantial part of the total area of the tubing and its weight consequently affects substantially the total weight of the tubing.

Another advantage is that the welded seam in the bottom of the corrugation prevents the tubing from being over-compressed when it undergoes the compression step for increasing its flexibility. This insurance against over-compression eliminates the necessity of the usual subsequent step in which the compressed tube is pulled out to the final pitch desired. The invention is also applicable to the manufacture of tubing having interlocked seams, and when used in this connection, the invention produces a tube that is stronger than a soldered tube; and that has the other advantages, already pointed out, of eliminating the solder wire, flux and furnace, and the subsequent cleaning and rehardening steps after the furnace heating.

Other objects, features and advantages of the invention will appear or be pointed out as the description proceeds.

In the drawing, forming a part hereof, in which like reference characters indicate corresponding parts in all the views:

Fig. 1 is a diagrammatic end view showing apparatus for making welded tubing in accordance with this invention, Fig. 2 is a sectional view taken along the line 2—2 of Fig. 1, Fig. 3 is a fragmentary plan view taken at the level 3—3 of Fig. 1, Fig. 4 is a sectional view through the forming apparatus just ahead of the last forming roll stand, Fig. 5 is an enlarged transverse sectional view through the preformed strip used for a lap seam, Fig. 6 is an enlarged transverse sectional view through a preformed strip that is used for making an interlocked seam, Fig. 7 is an enlarged scale view showing the manner in which a lap seam is welded in accordance with this invention, Fig. 8 is an enlarged sectional view showing the invention applied to the welding of interlocked seams at the top of the corrugations of the tubing, Fig. 9 is a view similar to Fig. 7, but with the lap seam at the top of the helical corrugation of the tubing, and with a wire wrapped on the mandrel to prevent collapsing of the corrugation during the welding operation.

The machine shown in Fig. 1 includes a mandrel 10 that rotates in a die 11 and to which is supplied a comparatively narrow strip of light gage metal 12. This strip is preformed at the time that it wraps around the mandrel 10; and in the apparatus illustrated, the forming is done in a forming unit 14 which comprises successive roll stands 15, 16, 17 and 18. Each of these roll stands operates to shape the metal strip 12 progressively to produce a longitudinal corrugation and edges that are shaped for the intended type of seam that is formed as the strip wraps in a helix around the mandrel 10 with adjacent edges of successive convolutions overlapping or engaging one another to form the seam.

The last roll stand 18 delivers the strip 12 to the mandrel 10 and die 11 with a transverse contour such as shown in Fig. 5, when the seam is to be a lap seam; and with a transverse contour such as shown in Fig. 6 when the tube is to be made with an interlocked seam. These strips are designated 12' and 12'', as indicated in Figures 5 and 6, respectively.

The preformed strip, represented by the reference character 12'', is wrapped around the rotating mandrel 10 and is drawn through the forming unit 14 by the pull of the mandrel 10 which is operated by power in accordance with conventional practice. The strip 12'' is fed to the mandrel 10 at an angle to the axis of the mandrel so that the strip wraps in a helix on the mandrel with the edges of the successive convolutions overlapping in a manner well understood in the art. The die 11 guides the strip as the strip wraps, and the ridges in the die advance the forming tubing and strip it progressively from the mandrel 10. Such dies are ordinarily equipped with a roller 20 at the region where the new run of the strip initially engages the preceding convolution in order to reduce the friction and apply a rolling pressure for seaming the tube when an interlocked seam is to be produced.

The illustrated apparatus and method for forming helically wound corrugated tubing is similar to that disclosed in the patent to Ingalls et al. 2,452,125, issued October 26, 1948, and in the Stone Patent 1,905,762, issued April 25, 1933. This invention can be used equally well, however, with other apparatus for making helically wound tubing, for example, with machines that wind the strip around a mandrel with rollers instead of a stationary die around the outside of the forming tubing.

In order to weld the seam formed by the overlapping edges of the strip 12', the mandrel 10 is used as one electrode of a welding circuit, and a wheel 22, outside of the tubing, is used as the second electrode. The mandrel 10 must have a lower electric resistance than the metal of which the strip 12' is made. In order to have the mandrel suitable for a wide variety of metal strips, the mandrel is made of copper or a copper alloy of low resistance. The wheel 22 is likewise made of copper alloy.

The wheel 22 is made with its peripheral portion relatively narrow so as to fit into the groove between successive corrugations of the tubing, and also for the purpose of reducing the area of contact with the metal strip so that the current density is high and the unit pressure against the metal is also high. Beyond its peripheral portion, the wheel 22 increases in width so as to obtain greater strength.

The overlapping seam edges must be clamped under heavy pressure between the mandrel 10 and the wheel 22 in order to obtain satisfactory results. The amount of pressure required depends upon the material being welded and to some extent upon the current density. Because of the pressure of the wheel 22 against the metal strip, and the fact that the wheel 22 must be made of copper alloy, the peripheral portion of the wheel tends to spread some with continued use. This spreading, commonly referred to as "mushrooming," would change the area of contact of the wheel and the work with resulting change in both the current density and the pressure. The invention includes means for preventing the "mushrooming" of the wheel 22.

The peripheral portion of the wheel 22 is maintained in its original shape, so as to obtain uniform welding results, by locating tools 24 and 25 (Fig. 3) at a fixed location around the periphery of the wheel 22. There is a tool 24 on each side of the wheel and a tool 25 in position to bear against the periphery face of the wheel 22. Any metal of the wheel 22 which is displaced by cold flow, resulting from the pressure of the wheel against the metal strip, is cut-off during the continued rotation of the wheel past the side tools 24. Occasionally the action of the side tools 24, in dressing the wheel, tends to displace some metal radially so as to destroy the smooth concentricity of the peripheral face of the wheel. To insure perfect concentricity and a clean peripheral face, the tool 25 is adjusted so as to just clear a peripheral face of the tool when the tools are initially positioned with respect to the wheel.

The tools 24 and 25 are located in sockets in a tool holder 26 and they are longitudinally movable in the sockets toward and from the wheel 22 for initial adjustment. These tools are secured in any adjusted position by means of set screws 27 threading into the tool holder 26.

The tool holder 26 is supported by a bracket 28 that extends from the same bearing as supports the wheel 22, and the tool holder is fastened to the bracket 28 by screws 29 extending through slots 30 in the tool holder. These slots 30 extend in a direction that permits adjustment of the tool holder 26 toward and from the axis of rotation of the wheel 22 so that the tool holder can be moved to accommodate wheels of different size and to compensate for eventual reduction of the diameter of the wheel 26 after continued dressing by the tools.

The mandrel 10 turns in a copper alloy bearing 33 having passages 34 through which cooling water is circulated. This bearing 33 is lubricated by graphite so as to maintain good electrical conductivity from the bearing 33 to the mandrel 10. Electricity is supplied to the bearing 10 through a conductor 36 that is connected to the bearing by a screw 37, shown in Fig. 1.

The wheel electrode 22 is attached to a hub 40 by screws 41. These screws 41 are representative of removable fastening means which permit replacement of the wheel 22. Experience has shown that wheels of different alloy composition are most efficient for the welding of metal strips of different material. The hub 40 rotates in a copper bearing block 44 which is lubricated by graphite as in the case of the mandrel in order to maintain an electric circuit of low resistance. A conduit 45 supplies cooling liquid and the discharge end of the conduit 45 is in position to flood the welding region with cooling liquid while the apparatus is operating to weld the edges together along the seam. There is a valve 45a in the conduit 45.

Electricity is supplied to the copper bearing block 44 through a conductor 46 which is fastened to the copper bearing by a screw 47. The conductors 36 and 46 are connected with any suitable source of welding current which is preferably supplied from a welding transformer with a synchronized timer that can be used to shift the frequency in accordance with the intended speed of welding so as to obtain a continuous weld. The speed with which the seam can be welded with this invention is limited only by the rate at which electric power for welding can be supplied. The invention is suitable for use with brass, stainless steel, or any other metal that can be welded by resistance welding.

The bearing block 44 is supported by a frustro-conical element 48 that is held by screws with its smaller diameter face against the top of the bearing block 44. This frustro-conical element is held in a complementary bearing in an intermediate block 49 with respect to which the bearing block 44 and element 48 have rotary motion about the axis of the element 48. A set screw 50 threads through the block 49 and into contact with the rotatable element 48 for holding that element and the connected bearing block 44 in any adjusted position.

The intermediate block 49 is connected to a slide block 51 by a dovetail slide 52 which can be locked in any adjusted position by a set screw 53. Another and upper dovetail slide 59, at the top of the slide block 51, extends in a plane parallel to that of the lower slide 52 and in a direction at right angles to the lower slide 52. This upper slide 54 connects the slide block 51 with the lower end of a post 56. A set screw 57 (Fig. 1) locks the slide block in any adjusted position lengthwise of the upper slide 54. This construction provides universal adjustment in a plane for the wheel 22 parallel to the axis of rotation of the mandrel, and the rotary adjustment of the frustro-conical bearing surface provides for adjustment of the wheel 22 to match the pitch of the helix of the seam.

The post 56 extends upward into a socket 58 in a portion of the fixed frame 59 of the apparatus. The post 56 is preferably square, or of other non-circular shape that fits the cross section of the socket 58 so that the post cannot rotate in the socket. The upper end of the socket 58 is threaded, and there is a bushing 60 screwed into it. The upper end of the post 56 is of reduced diameter and comprises a stud 62 which extends through the opening in the bushing 60 and for a substantial distance above both the frame 28 and the bushing 60.

The opening through the housing 60 is of enlarged diameter for a substantial distance above its lower end to provide a recess 64 for a compression spring 66 that is clamped between the upper end of the recess 64 and the shoulder of the post 56 where the cross section of the post decreases from that of the socket 58 to that of the stud 62.

At the upper end of the bushing 60 there is a handle 68 by which the bushing is rotated to screw it up and down in the threaded portion of the socket 58. Screwing the bushing further down into the socket 58 increases the pressure on the spring 66, and conversely, rotation of the bushing 60 in the opposite direction decreases the pressure on the spring 66. At the upper end of the stud 62 there is a pin 71 extending across the upper face of a thrust bearing 72. This thrust bearing 72 contacts with the top face of the bushing 62 just above the handle 68.

With this construction, the pin 71 and thrust bearing 72 limit the downward movement of the post 56 with respect to the bushing 60. However, when the wheel 22 is in contact with the metal strip on the mandrel, and the handle 68 is rotated to screw the bushing 60 further down in the socket 58, the bushing moves downward independently of the post 56, and its stud 62.

Figures 5-9 illustrate the different kinds of seams that can be welded in accordance with this invention. The seam shown in Figure 5 has the edges of adjacent convolutions overlapping one another with a single thickness each of overlapping edge at the bottom of each groove between successive corrugations. This seam is welded, as shown in Fig. 7, by having the wheel 22 clamp the overlapping seam edges directly against the mandrel 10 with sufficiently heavy pressure for the kind of material and current density that are being used. The peripheral edge portion of the wheel 22 is made narrow enough to extend into the grooves of the corrugated tube.

This construction with the seam at the bottom of the helical groove of the tubing has the advantage of limiting the compression of the tube during that step of its manufacture where the ends of the tube are pushed toward one another to force all of the corrugations into contact with one another. The double thickness provided by the overlapping edges provides enough stiffness to prevent the tube from bending across the bottoms of the grooves. The side walls of the corrugations bend until the successive corrugations come into contact with one another. There is sufficient spring in the material, however, to cause the corrugations to spring apart slightly when the pressure is relieved, and with the bottoms of the grooves reinforced against bending, this springing apart of the corrugations leaves the tube with the correct pitch, except in cases where very soft metal strips are used for making the tube.

Fig. 6 shows the way in which the adjacent edges of the helical seam are initially brought together to make an interlocked seam. These edges are folded over to produce the seam shown in Fig. 8. When welding such a seam, it is necessary to have some backing against which the wheel 22 can clamp the seam to obtain the necessary pressure without crushing the corrugations. A wire 75 is wrapped around the mandrel 10 with a pitch equal to that of the helix of the seam. This wire 75 is fed into the die with the formed strip and in such relation to the formed strip that the wire is enclosed within the helical corrugation and under the interlocked seam.

The wire 75 is a copper wire so that it provides a low resistance path for electricity from the interlocked seam to the mandrel 10. After the interlocked seam has been welded, in the manner illustrated in Fig. 8, and the tube has been stripped from the mandrel, the wire 75 is removed from the tube.

Fig. 9 shows another modification in which lap seams are welded at the top of the corrugations in the same manner as the interlocked seams shown in Fig. 8. The seam shown in Fig. 9 is the same as that shown in Fig. 7 except that the overlapping edges of the seam are at the tops of the corrugations instead of being in the bottoms of the grooves between corrugations. In order to provide a backing against which the wheel 22 can clamp the formed strip 12', the wire 75 is wrapped on the mandrel 10 under the lapped edges as in the case of the interlocked seam. The construction shown in Fig. 9 does not have the same advantages in limiting the compression of the tube, as explained in connection with Fig. 7, but it does have the advantage that it can be used with tubes of very small size having grooves between the corrugations that are not wide enough to admit the electrode wheel 22. The construction shown in Fig. 9 is not a small tube, the formed strip being the same as that shown in Figs. 5 and 7 with the orientation of the tube reversed, that is, with the longitudinal corrugation of the formed strip opening outwardly instead of inwardly. This form of strip is obtained by turning upside down the forming apparatus that contains the roll passes that shape the strip to the desired transverse contour.

The preferred embodiment of the invention has been illustrated and described, but changes and modifications can be made and some features can be used alone or in different combinations without departing from the invention as defined in the claims.

What is claimed is:

1. Apparatus for making helical seam tubing, including a mandrel having a continuous and smooth outside surface for supporting the convolutions of the tubing, mechanism that rotates the mandrel about its longitudinal axis, guide means through which a metal strip is supplied to the mandrel in a direction to wrap in a helix around the mandrel and in direct contact with the mandrel and with adjacent edges of successive convolutions overlapping one another to form a seam, said mandrel comprising one electrode of a resistance welding circuit, a wheel comprising the other electrode of the welding circuit, a bearing by which the wheel is carried, a support for the bearing in position to locate the wheel over the seam and adjacent to the mandrel, and means applying pressure to the wheel in the direction of the mandrel to clamp the seam edges together under heavy pressure, means that strip the tubing from the mandrel progressively as the tubing is formed, and cooling means comprising a liquid-supply conduit with an outlet in position to flood the welding region with cooling liquid while the wheel is operating to weld the seam.

2. A tube-making machine comprising a mandrel, mechanism that rotates the mandrel about its longitudinal axis, a bearing in which the mandrel rotates, a conductor which supplies electric power to the mandrel to constitute the mandrel an electrode for resistance welding, apparatus that feeds a longitudinally corrugated and preformed strip to the mandrel in a direction to wrap in a helix about the mandrel with the adjacent edges of successive convolutions of the helix overlapping one another to form a seam, a second electrode comprising a wheel that has a peripheral edge portion of reduced width in rolling contact with the seam immediately over the mandrel, a pressure device that holds the wheel against the seam with heavy pressure, and means for maintaining the unit pressure of the second electrode substantially constant, said means comprising a tool located along the periphery of the wheel in position to dress the wheel and maintain the shape of the peripheral edge portion of the wheel while the machine is in operation.

3. A machine for making flexible corrugated tubing, said machine comprising a mandrel, mechanism for rotating the mandrel, guide means that supply a longitudinally corrugated strip to the mandrel in a direction to wrap as a helix about the mandrel with edges of successive convolutions of the strip overlapping one another to form a seam, conductors that supply electric power to the mandrel to constitute the mandrel one electrode of a resistance welding circuit, a second electrode of the circuit comprising a wheel made of copper alloy and having a moderately sharp peripheral edge portion that contacts with the strip material along the seam, a pressure device that holds the wheel against the seam under heavy pressure, means for maintaining the unit pressure of the second electrode substantially constant, said means comprising tools at fixed locations around the periphery of the wheel in position to dress the wheel as it rotates, said tools including at least one tool that dresses the side of the wheel around its peripheral portion to remove metal displaced by any mushrooming of the wheel, and another tool that dresses the periphery of the wheel to maintain the concentricity of the wheel.

4. Tube-making apparatus comprising a plurality of forming-roll stands through which a strip of metal passes to produce a longitudinally extending corrugation of the strip, a mandrel located beyond the last forming-roll stand in position to wrap the strip in a helix as the strip is fed to the mandrel from the last forming-roll stand, mechanism that rotates the mandrel, said mandrel being made of copper alloy and being connected with a conductor which supplies electric power and which constitutes the mandrel an electrode for resistance welding, means that guide the edges of the strip to bring them into overlapping relation in the groove between successive outwardly extending corrugations of the tubing as said tubing forms on the mandrel, a second electrode comprising a copper alloy wheel having a peripheral portion of reduced width that extends into the groove between successive corrugations and into contact with the seam of the tubing at a position over the mandrel, a pressure device urging the wheel toward the mandrel to maintain a heavy pressure on the seam between the mandrel and the wheel, means for maintaining the unit pressure of the second electrode substantially constant, said means comprising a tool located at a fixed support adjacent the wheel in position to dress at least the sides of the peripheral portion of the wheel to remove any metal displaced by mushrooming of the peripheral portion of the wheel.

5. Tube-making apparatus comprising a plurality of forming-roll stands through which a strip passes and in which it is shaped to have a longitudinally extending corrugation between its edges and shaped with an upturned flange at one edge and a folded-over portion along the other edge, a mandrel located beyond the last forming-roll stand in position to wrap the strip in a helix with the upturned flange of one edge engaging the folded-over edge or the next adjacent convolution of the helix, said mandrel being made of copper alloy and having a continuous and substantially cylindrical surface on which the strip wraps, a conductor that supplies electric power to the mandrel to constitute the mandrel one electrode for electric resistance welding, guide means that supply a wire to the mandrel in a direction and at a location to wrap in a helix with the convolutions of the wire underlying the seam of the tubing, die means that fold over and seam the engaged edges of the strip, another electrode comprising a wheel made of copper alloy and located in position to contact with the seam of the tube beyond the die means, a bearing supporting the wheel for rotation about the longitudinal axis of the wheel, and supporting means for the bearing movable to adjust the axis of rotation of the wheel with respect to the axis of the mandrel, and to adjust the wheel parallel to the axis of the mandrel and in directions tangent to the mandrel, the supporting means including a spring that loads the wheel to produce a substantial pressure of the wheel against the folded seam.

6. Tube-making apparatus comprising a copper alloy mandrel having a continuous and substantially cylindrical outside surface, mechanism that rotates the mandrel about its longitudinal axis, guide means that supply a longitudinally corrugated metal strip to the mandrel in a direction to wrap in a helix about the mandrel with formed edges of successive convolutions engaging one another at the top of a corrugation, die means that bend the engaged edges into interlocking relation to seam the tubing along the top of the corrugation, a conductor that supplies electric power to the mandrel to constitute the mandrel an electrode for resistance welding, other guide means that supply a wire to the mandrel in a direction to wrap in a helix around the mandrel with the wire underlying the seam of the tubing, a second electrode comprising a wheel in rolling contact with the interlocked seam of the tubing above the mandrel and the wire, a resilient pressure device that urges the wheel against the seam with heavy pressure, and cooling means comprising a liquid-supply conduit with an outlet in position to flood the welding region with cooling liquid while the wheel is operating to weld the seam.

7. Tube-making apparatus as defined in claim 6, and in which the pressure device comprises a spring urging the wheel toward the mandrel, and in which the wheel is made of a copper alloy and has a moderately sharp peripheral edge portion for confining its contact to a narrow area, and there are tool means supported at a fixed location near the side of the peripheral edge portion of the wheel for removing any metal displaced by mushrooming of the copper alloy wheel under the pressure applied by said spring.

8. Tube-making apparatus as defined in claim 6, and in which the pressure device comprises a spring urging the wheel toward the mandrel, and in which the wheel is made of copper alloy and is provided with a moderately sharp peripheral portion for reducing its area of contact with the tube, and in which there are supports for the wheel including parts relatively movable with respect to one another in directions to adjust the wheel about an axis normal to the axis of rotation of the wheel, parallel to said axis of rotation and parallel to the tangent through the point of contact of the wheel with the tubing, and a dressing tool that is carried by the same adjustable supports as the wheel for adjustment as a unit with the wheel, said dressing tool being located adjacent to the periphery of the wheel for rmoving any metal displaced by cold flow during operation of the wheel.

9. Apparatus for making helical seam tubing, including a mandrel, guide means that supply a strip to the mandrel in a direction to wrap in a helix on the mandrel with the adjacent edges of successive convolutions overlapping one another to form a seam, a conductor that supplies electric power to the mandrel to constitute the mandrel one electrode for a resistance welding circuit, a second electrode comprising a wheel in position to roll on the seam, a conductor that supplies power to the wheel to constitute the wheel the second electrode of the welding apparatus, and means to flood the welding region with a cooling liquid while the apparatus is operating to weld the edges together along the seam.

10. The method of making flexible tubing which comprises wrapping a longitudinally corrugated strip in a helix about a mandrel with the strip in direct contact with the surface of the mandrel and with adjacent edges of successive convolutions of the strip overlapping one another to form a seam and with the longitudinal corrugations opening toward the outside of the tube so that as the seam is formed the edges come together to make another corrugation that opens inwardly; guiding a wire into contact with the mandrel at an angle that causes the wire to wrap on the mandrel and fill the space under the seam, compressing the overlapping edges of the seam against the mandrel with a wheel under heavy pressure, welding the seam with the wheel and mandrel as the opposing electrodes for making a resistance weld between the overlapping edges of the tubing, stripping the tubing from the mandrel progressively as it is formed, and flooding the welding region with cooling liquid while welding.

11. The method of making light, flexible metal tubing, which method comprises supplying to the mandrel a thin strip of metal having a longitudinally extending corrugation with its open side toward the mandrel, wrapping the preformed strip in a helix on the mandrel with the strip in direct contact with the surface of the mandrel and with the edges of each successive convolution overlapping the edge of the preceding convolution to form a lap seam between successive convolutions of the corrugations, clamping the overlapping edges of the strip firmly against the surface of the mandrel by a rolling pressure applied to the outer surface of the seam, welding the seam by resistance welding produced by current flowing through the overlapping edges of the seam between the mandrel and the instrumentality that supplies the clamping pressure to the outside of the seam, stripping the tubing from the mandrel progressively as it is formed, and flooding the welding region with cooling liquid while welding.

12. In the manufacture of helically wound, corrugated tubing, the improvement which comprises wrapping a preformed strip around the mandrel as a helix with the edges of successive convolutions overlapping one another to form a seam, clamping the overlapping edges firmly against the mandrel by means of rolling pressure applied with a wheel, and maintaining the unit pressure of the wheel on the strip substantially uniform by dressing the wheel to its original peripheral contour as successive peripheral portions of the wheel pass a fixed location during the rotation of the wheel, and while applying welding current through the wheel to the strip.

13. The method of making helically corrugated flexible tubing, which method comprises winding a preformed strip in a helix around and in direct contact with the mandrel which constitutes one of the electrodes of a resistance welding circuit, with the edges of successive convolutions of the strip overlapping one another to form a seam, welding the seam by current supplied through a rolling contact pressed against the outside of the seam to clamp the overlapping edge portions of the seam firmly against the surface of the mandrel, stripping the tubing from the mandrel progressively as it is formed, and flooding the welding region with a cooling liquid while the apparatus is operated to weld the overlapping edges together.

DANIEL PAUL SCHWESTER.

References Cited in the file of this patent

UNITED STATES PATENTS

| Number | Name | Date |
|---|---|---|
| 1,198,392 | Brinkman | Sept. 12, 1916 |
| 1,522,345 | Tilden | Jan. 6, 1925 |
| 2,273,027 | Dreyer | Feb. 17, 1942 |
| 2,313,329 | Evert | Mar. 9, 1943 |
| 2,314,611 | Dreyer | Mar. 23, 1943 |